United States Patent [19]

Schwarz et al.

[11] Patent Number: 4,647,993
[45] Date of Patent: Mar. 3, 1987

[54] ROTARY HEAD RECORDING SYSTEM

[75] Inventors: Edward L. Schwarz, Minneapolis; Theodore A. Schwarz, Bloomington, both of Minn.

[73] Assignee: Magnetic Peripherals Inc., Minneapolis, Minn.

[21] Appl. No.: 636,931

[22] Filed: Aug. 2, 1984

[51] Int. Cl.$^4$ .................... G11B 5/027; G11B 5/127
[52] U.S. Cl. ......................................... 360/84; 360/125
[58] Field of Search ........................... 360/84-85, 360/110, 119, 125

[56] References Cited

U.S. PATENT DOCUMENTS 3,320,371 5/1967 Bach ........................................ 360/84

FOREIGN PATENT DOCUMENTS 1149390 3/1963 Fed. Rep. of Germany ...... 360/125

Primary Examiner—A. J. Heinz
Attorney, Agent, or Firm—J. A. Genovese; E. L. Schwarz

[57] ABSTRACT

An improved rotary read/write head assembly is particularly suitable for use with a vertical format magnetic recording medium such as tape in a magnetic recording system. A rotary element of the assembly carries a plurality of main poles whose tips are at an edge of the rotary element and kept in substantially contacting relationship with the medium. Rotation of the element causes the pole tips to successively sweep across the medium and sequentially function as the main pole of a probe head.

3 Claims, 7 Drawing Figures

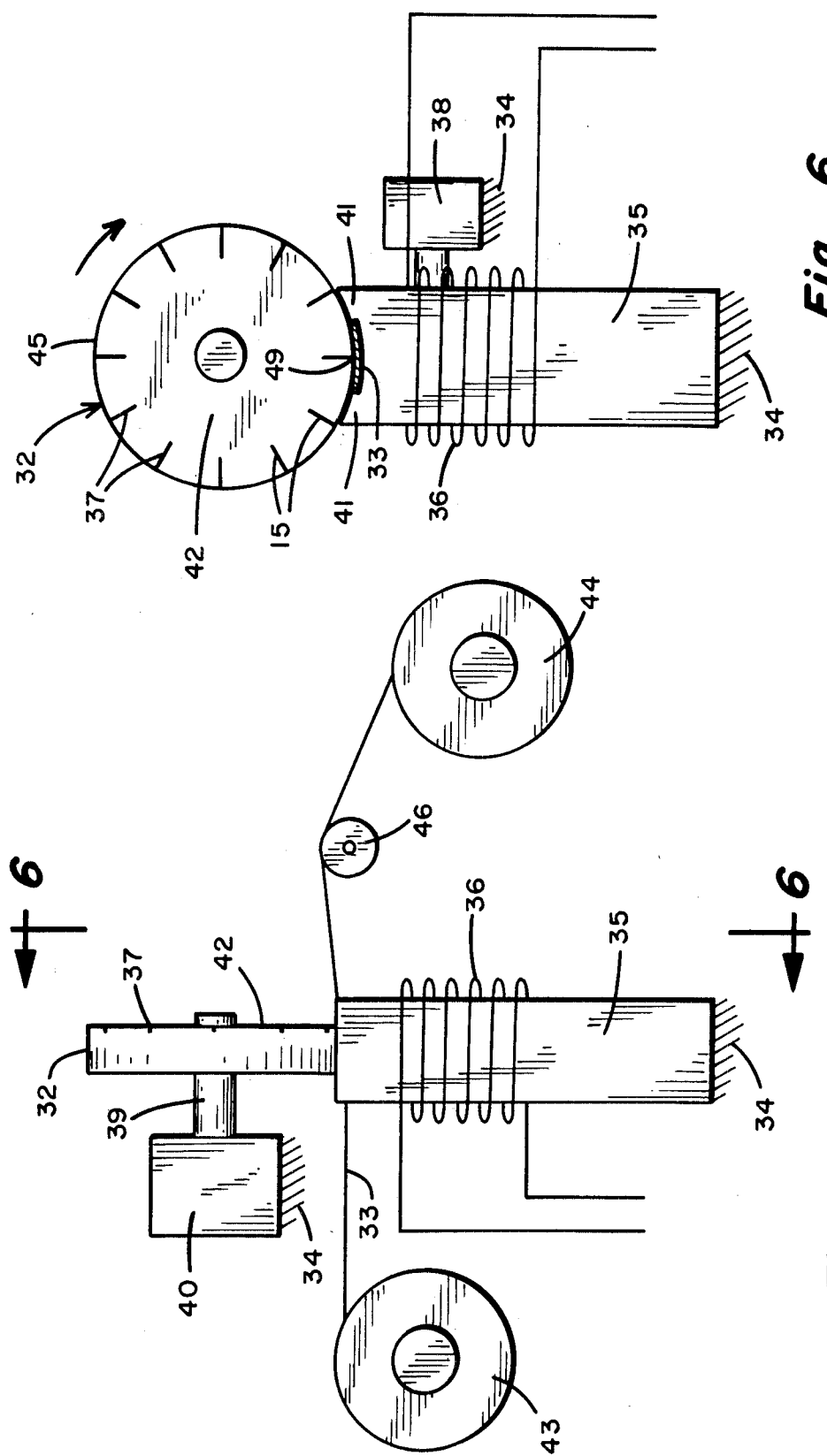

ROTARY HEAD RECORDING SYSTEM

BACKGROUND OF THE INVENTION

In certain magnetic recording applications, very high data rates are necessary. To accommodate these high data rates, it is customary to employ a rotating member or head carrier on which one or more read/write heads are mounted. The member is rotated so that the heads it carries sweep across the medium, allowing high data rates to be achieved without excessively high medium speed. The usual application is in video recording.

A problem with these rotary heads involves supplying the signals to the heads for writing and receiving the signals for reading. Slip rings are an obvious solution, but the relatively low signal level involved, particularly during reading or playback, results in poor playback accuracy. It is possible to include an on-board amplifier which can increase the power of the signal read back before it is placed on the slip rings. This, however, requires additional slip rings to transmit the power to the on-board amplifier, a multiplexer to switch from one head to another if more than one are employed, and timing control circuitry for the multiplexer.

It is also possible to use a transformer coupling between the rotating head and the remainder of the system, one winding of the transformer rotating with the head carrier. All of these solutions add additional complexity to a system whose price and reliability is not totally satisfactory with present technology. Accordingly, there is strong motivation to reduce the cost and complexity of these assemblies without affecting performance.

BRIEF DESCRIPTION OF THE INVENTION

In vertical recording, the so-called single layer medium system employs a probe head including a very large auxiliary pole carrying the winding, and a relatively small main pole which in general need not be connected in a direct magnetic circuit to the auxiliary pole, instead relying solely on stray flux to complete the flux path. It is possible to write and read with such a main pole on a medium which is stationary with respect to the auxiliary pole by moving the main pole relative to the medium. It is also possible to read and write on such a medium which is moving relatively slowly with reference to the auxiliary pole, and with the main pole moving relatively rapidly with respect to the medium. Satisfactory data transcription can only occur where the medium does not protrude past the edges of the auxiliary pole, and when the main pole tip is substantially in contact with the medium.

Since the main pole in a probe head needs no direct magnetic circuit connection to the auxiliary pole, such a main pole can be carried by a pole carrier having an end face and a peripheral area whose intersection with the end face is a circle. The pole carrier may be mounted for rotation about an axis centered on and perpendicular to this circle of intersection. The configuration of the pole carrier and the shape of the medium must be such that at least an arc of the circle of intersection is in substantially contacting relationship across a side of a medium. A plurality of the main poles are mounted on the pole carrier such that their read/write tips are coincident with the aforementioned circle of intersection and directed toward the medium. As the pole carrier rotates, the read/write tips sweep across the medium along the arc of the circle of intersection in substantially contacting relationship with the medium, thereby allowing data transcription on the medium.

It is also possible to tailor the individual main poles for reading or for writing. In such an embodiment, the read poles and write poles alternate. Individual write poles are relatively thick so as to carry a greater amount of flux so the medium can saturate. Their tips may be relatively long (in a tangential direction relative to the circle of intersection) and wide so as to create a relatively wide data track. Individual read pole tips may be relatively short (in a tangential direction) to improve resolution, and narrower, to ensure accurate positioning within the track. Each type of pole is activated according to the winding function, which must be synchronized with the sweeping of the proper pole across the medium.

There are at the present time at least two preferred embodiments of this invention, each employing a round disc mounted for rotation about its axis, as a pole carrier. On the one hand, the main poles may be mounted on the flat end face of the pole carrier and extend approximately radially relative to the pole carrier's axis of rotation, with the carrier's axis generally parallel to the immediate area of the medium on which the data being transcribed is stored. In this embodiment, the medium must be forced to conform to the curved shape of the circle of intersection. In another embodiment, the poles are at least partially carried on the circularly cylindrical periphery of the carrier and are arranged to be generally parallel to the carrier axis. The carrier axis is configured to be generally perpendicular to the area of the medium on which the data being transcribed is stored. In this second embodiment, the arc swept by each read/write tip coincides with a plane, and it is not necessary to conform the shape of a flat medium to match the circular shape of the path traced by each individual read/write tip as it transcribes data on the medium. Conforming the shape of the medium to the path traced by the read/write tip is necessary because in vertical recording it is necessary that the read/write tip at all times pass across the medium surface in substantially contacting relationship with it during transcribing of data.

It is preferred that the medium be a magnetic tape carried on reels or spools and moved slowly, relative to the tangential speed of individual main pole tips, across the auxiliary pole read/write face. The second of the two embodiments described above is preferred for use with magnetic tape since there is no need to conform the cross-section of the tape to match the curved outer edge of the circle of intersection. Instead, the auxiliary pole can be formed with a substantially flat area at its tip over which the tape is stretched. The carrier is oriented with its axis of rotation perpendicular to this flat area and with the circle of intersection in substantially contacting relationship with the medium. Ideally, some means for compressing the tape between the flat area of the auxiliary pole and the circle of intersection on the pole carrier obtains the substantially contacting relationship necessary between the individual read/write tips of the main poles and the medium surface itself.

Accordingly, one purpose of this invention is to provide a rotating magnetic head assembly for which the winding is stationary.

A second purpose is to provide a vertical recording read/write head assembly which does not require high precision alignment or placement between its various parts.

Another purpose is to provide such a rotary head assembly which does not require a mechanically completed magnetic circuit through low reluctance material.

Yet another purpose is to provide an assembly capable of creating narrow data tracks on a magnetic tape medium transverse to its length.

BRIEF DESCRIPTION OF THE DRAWINGS

FIG. 5 is a side view of a magnetic tape transcribing system including a rotary head assembly of the type whose pole carrier's axis is generally parallel to the area of the medium on which the data being transcribed is stored.

FIG. 6 is a section view of the system of FIG. 5 viewing parallel to the axis of rotation of the pole carrier.

DESCRIPTION OF THE PREFERRED EMBODIMENT

Figure 1:
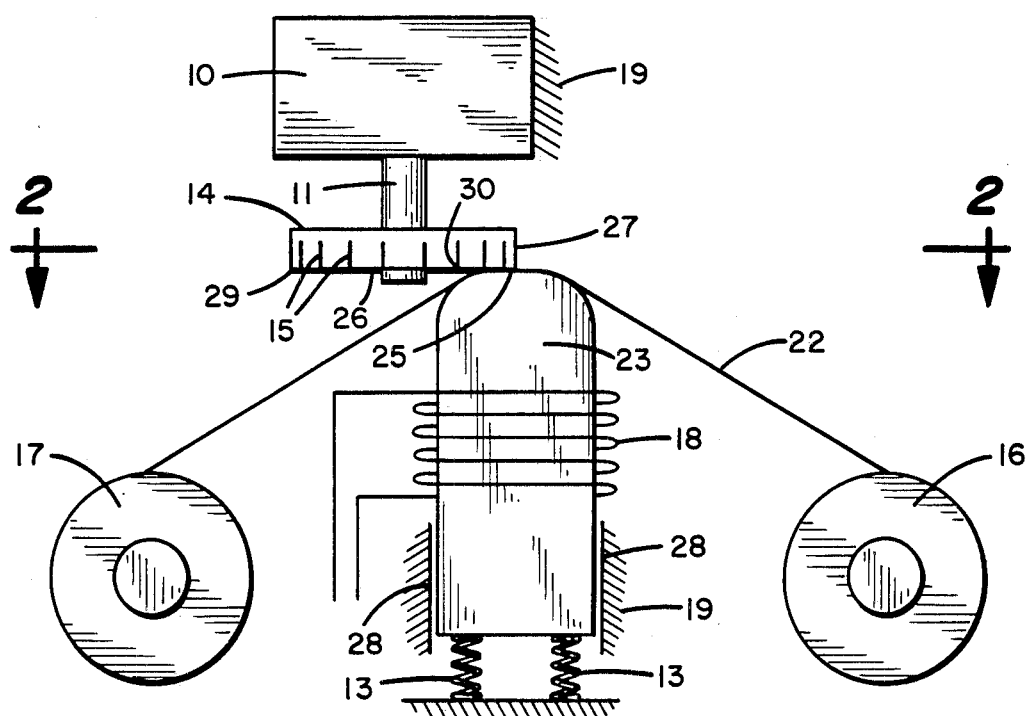
FIG. 1 is a side view of a magnetic tape transcribing system including a rotary head assembly of the type whose pole carrier's axis is generally perpendicular to the area of the medium on which the data being transcribed is stored.

Turning first to FIG. 1, a rotary head assembly constructed according to the teachings of this invention is shown as comprising an auxiliary pole 23, having a winding 18 around its body. Pole 23 is composed of a magnetic material such as soft iron or ferrite. Pole 23 is arranged to slide in a guideway 28 carried by frame 19. Both guideway 28 and frame 19 are shown only symbolically in FIG. 1 since their detailed structure is irrelevant to this invention. Auxiliary pole 23 is urged in a first direction, shown as upwards in FIG. 1, by compression springs 13 interposed between it and frame 19. The tip of auxiliary pole 23 has a flat land or area 25, see FIG. 2, which is smoothly blended into the remainder of the tip. A magnetic tape medium 22 is stretched taut across this flat area 25 by action of reel motors 20 and 21 carried by frame 19 and driving take-up reels 16 and 17, respectively, on which the portions of the tape not being presented for data transcription are stored (see FIG. 2).

A motor 10 is also mounted on frame 19 and drives a shaft 11 on which pole carrier 14 is fixedly mounted for rotation. Pole carrier 14 is a circular cylinder whose height may be small relative to its radius and includes a cylindrical periphery 27 and an end face 26 shown on edge in FIG. 1. End face 26 may be flat or it may be slightly concave. Periphery 27 and end face 26 intersect to form a circle, hereafter referred to as the circle of intersection 29 shown in projected outline in FIG. 2. The mounting of pole carrier 14 is such that shaft 11 is concentric with and perpendicular to circle of intersection 29. Around the periphery 27 of pole carrier 14 a number of equi-spaced main poles 15 are mounted, each with its transcribing tip 30 (shown in FIG. 1) positioned coincident with circle of intersection 29. Main poles 15 may comprise printed magnetic ink or sections of fine iron wire. The major axis of each main pole 15 adjacent its tip 30 is directed toward the tape 22.

Auxiliary pole 23 and pole carrier 14 are positioned relative to each other such that at least an arc of the circle of intersection 29 is in substantially contacting relationship along its length across the surface of tape 22, as the tape passes across flat tip area 25 of auxiliary pole 23. The transcribing tip 30 of each main pole 15 is positioned on the periphery such that it sweeps across tape 22 along the arc of the circle of intersection 29 in substantially contacting relationship with the medium while pole carrier 14 rotates. With such physical relationship between auxiliary pole 23 and main poles 15, signals placed in winding 18 allow data to be written onto tape 22 as reel motors 20 and 21 slowly move tape 22 across the flat area 25.

Figure 3:
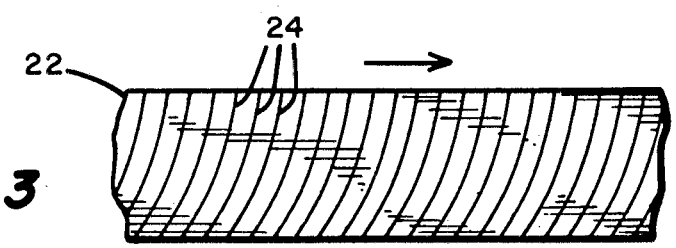
FIG. 3 is a sketch of individual data tracks created on its medium by the apparatus shown in FIGS. 1 and 2.

In FIG. 3, representative data tracks 24 are shown as they are created by individual main poles 15 sweeping across tape 22 moving to the right at a linear speed relatively low compared to the tangential speed of poles 15. It should be observed that the length of the chord between adjacent main pole tips on circle 27 should be no less than the width of tape 22, or at least the width of recording surface on it, so as to prevent two poles 15 from simultaneously sweeping across tape 22 and causing erroneous data transcription. Reading occurs by sweeping individual main poles 15 across tape 22 along individual data tracks in a sequential fashion so as to cause a signal to be induced in winding 18 indicative of the recorded data. It is necessary that rotational speed of carrier 14 be synchronized with movement of tape 22 so that each main pole tip 30 sweeps along the center of the track being read. Well known means for accomplishing this do not form a part of this invention.

It is known that the transcribing tip 30 of a main pole 15 in a vertical recording system must be in substantially contacting relationship with the medium for proper data transcription to occur. Reel motors 20 and 21 must keep tape 22 stretched tautly across flat tip area 25, and to effect this employ techniques well known in the art. Springs 13 urge auxiliary pole 23 along the path dictated by guideway 28 to cooperate in causing tape 22 to assume exactly the shape of the tip area 25 of auxiliary pole 23 where it passes across it, in particular conforming it to the shape of flat area 25. Springs 13 must generate enough force to hold tape 22 against the arc of the circle of intersection 29 which must be in substantially contacting relationship with tape 22. Since the plane defined by circle of intersection 29 is precisely parallel to flat area 25 by virtue of the perpendicular positioning of the shaft 11 axis relative to flat area 25, the entire arc of the circle of intersection 29 crossing tape 22 stays in constant contact with tape 22, and thus the tips 30 of poles 15 also stay in substantially contacting relationship with tape 22.

Figure 4:
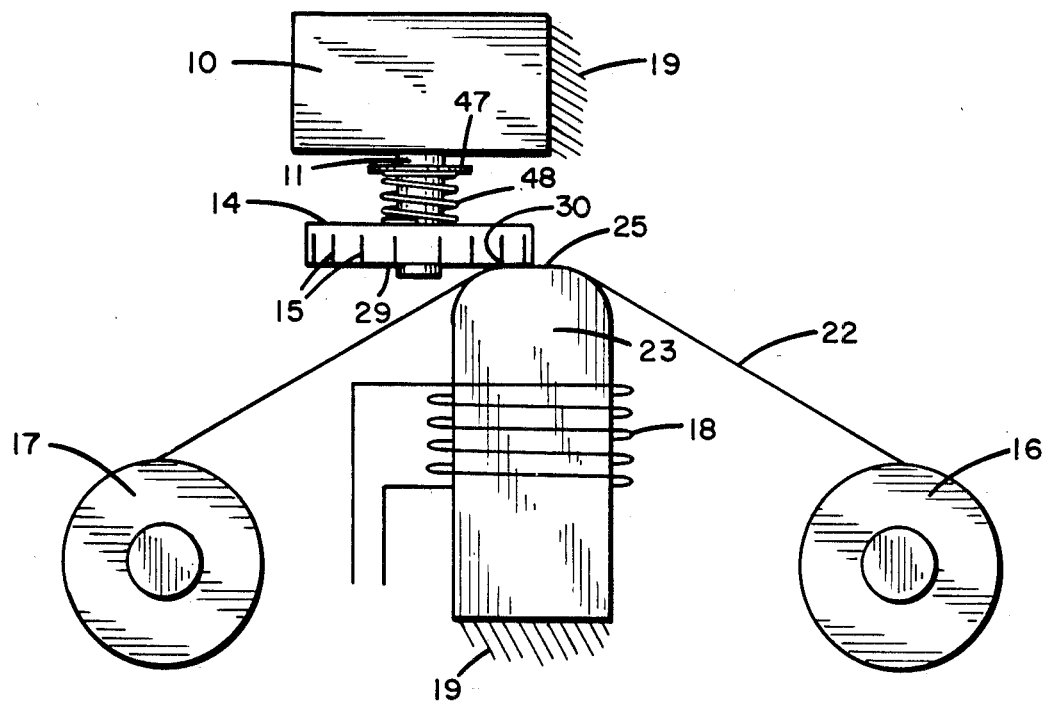
FIG. 4 is an alternative embodiment of the system of FIG. 1.

An alternative mechanism, very similar to that of FIG. 1, for ensuring the substantially contacting relationship between the read/write tips of pole 15 with tape 22 is shown in FIG. 4. In this embodiment, auxiliary pole 23 is rigidly affixed to frame 19. Pole carrier 14 has a splined interior hole and is mounted so that it can slide over a length of shaft 11 on matching splines. A stop 47 is fixed to shaft 11 and a compression spring 48 encircles shaft 11 between stop 30 and the upper surface of pole carrier 14. Spring 48 provides constant pressure on pole carrier 14 causing its circle of intersection 29 to lie on flat area 25 at the tip of auxiliary pole 23 with tape 22 between them so that as shaft 11 rotates pole carrier 14, the read/write tips 30 of individual poles 15 are swept across the width of tape 22 in substantially contacting relationship with tape 22.

A second preferred embodiment is shown in FIGS. 5 and 6, and generally involves the use of a pole carrier 32 which carries on its end face 42 a number of main poles 37, whose lengths at least adjacent their tips 49 at the periphery of pole carrier 32 extend along radii of the pole carrier. In FIG. 5, an auxiliary pole 35 is mounted on a symbolically shown frame 34 with its tip adjacent a first side of a tape 33. A winding 36 around pole 35 provides for applying a write current and receiving the read voltage. It is again preferred that a magnetic tape be employed for medium 33, and that it be carried on storage reels 43 and 44. Storage reel 43 is driven by a motor 38 shown in FIG. 6 and which is mounted on the symbolically shown frame 34. Motor 38 which drives reel 43 and a similar motor not shown driving reel 44 are controlled by a mechanism well known in the art to keep tape 33 relatively taut.

A motor 40 mounted on frame 34 drives a pole carrier 32 carried on a shaft 39. Pole carrier 32 includes an end face on which are mounted main poles 37. These main poles at least near their tips 49 extend generally radially relative to the axis of rotation of carrier 32. The end face 42 of pole carrier 32 intersects the pole carrier's periphery to form a circle of intersection 45 shown projectively in FIG. 6. Shaft 31 is perpendicular and precisely concentric with this circle of intersection 45. Main poles 37 are arranged such that their transcribing tips 49 are coincident with the circle of intersection 45. Carrier 32 is mounted so that its circle of intersection 45 is positioned adjacent to the tip of auxiliary pole 35 with the tips of individual main poles 37 adjacent auxiliary pole 35 at any given time directed toward auxiliary pole 35 and adjacent a second side of tape 33. A clearance space between the periphery of pole carrier 32 and the tip of auxiliary pole 35 allows tape 33 to pass between them. The face of the auxiliary pole 35 tip conforms to the curvature of the periphery of pole carrier 32.

Shoulders 41 fill in at least a portion of the edges of the clearance space and function as guides to keep tape 33 accurately positioned between the tip of auxiliary pole 35 and pole carrier 32. Thus, as pole carrier 32 rotates, friction between it and tape 33 does not drag it from directly between auxiliary pole 35 and carrier 32.

It is preferred that the section of the tape 33 between reel 44 and carrier 32 be stretched over circle of intersection 45. Intermediate roller 46 is positioned to form a slight bend in tape 33 as it passes over circle of intersection 45 to cause constant pressure between them so that the cross-section of the tape conforms itself to an arc of the circle of intersection 45 and places circle of intersection 45 in substantially contacting relationship with tape 33 in this area. The arc length between adjacent main poles 37 on pole carrier 32 should be slightly greater than the width of tape 33, or at least the strip of recording material on it, so that one transcribing tip 49 has completely swept past tape 33 before another tip 49 of pole 37 has made contact with it.

Figure 2:
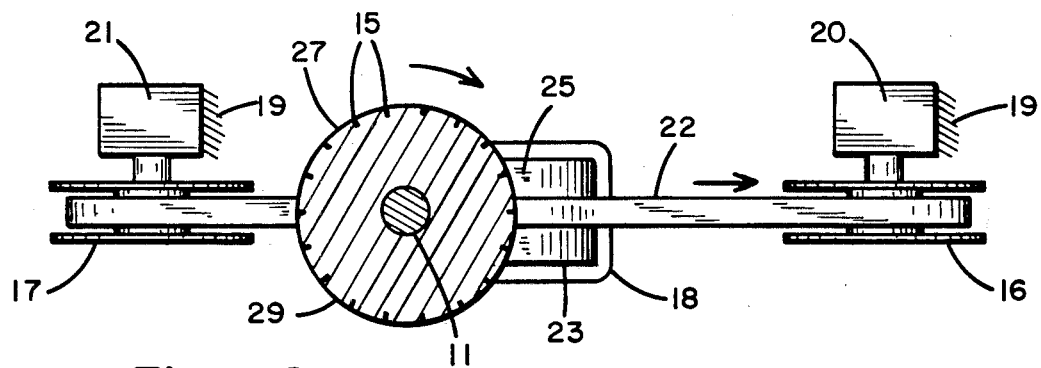
FIG. 2 is a section view of the apparatus of FIG. 1 viewing parallel to the axis of rotation of the pole carrier.

As explained for the apparatus of FIG. 1, rotation of pole carrier 42 by motor 40 causes individual transcribing tips 49 of poles 37 to sweep across the surface of tape medium 33. As tape medium 33 is slowly moved in a direction generally parallel to the axis of shaft 39, data transcribing occurs on the surface of tape 33 as the individual pole tips 49 sweep across it. Data tracks are created on the surface of tape 33 when a write current is applied to winding 36. Assuming constant speeds for both pole carrier 32 and tape 33, the individual data tracks will be parallel straight lines rather than curved, as shown in FIG. 3. Reading occurs by simply receiving the signals generated in winding 36 while tape 33 is moved and carrier 32 rotates. In both cases, the movement of pole carrier 32 and tape 33 in synchronized fashion, mentioned in conjunction with FIGS. 1 and 2, is required.

Figure 7:
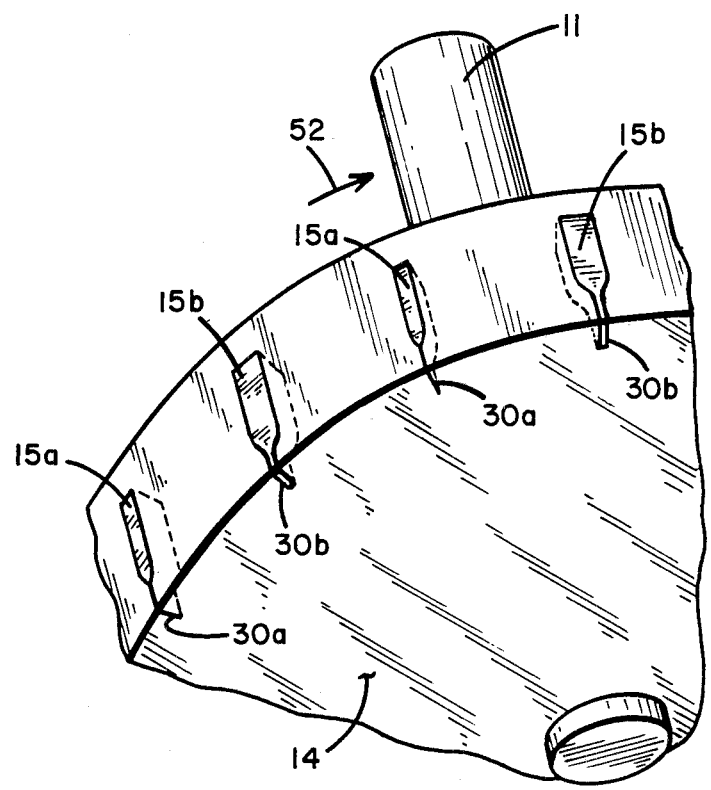
FIG. 7 is a detail drawing of a portion of the pole carrier of FIG. 1, and which depicts main poles having different transcribing functions.

FIG. 7 discloses a preferred structure for the main poles 15 and their carrier 14. As mentioned earlier, writing usually involves much higher flux levels emanating from the pole tips so as to saturate the medium. Furthermore, it is usual to write with a relatively wide pole tip. Conversely, resolution is improved and sensitivity to noise is reduced during reading by a pole tip which is relatively narrow and short compared to a preferred write pole tip.

Accordingly, in FIG. 7, there are shown two different pole tips 15a and 15b both carried on the edge of carrier 14, of which only a segment is shown. Pole 15b is a write pole, and pole 15a is a read pole. Approximate motion of the periphery of carrier 14 and individual pole tips 30a and 30b relative to the medium (not shown) is indicated by arrow 52. The length of each read pole tip 30a is relatively smaller (measured tangentially to the periphery of carrier 14) and its width relatively smaller (measured along a radius of carrier 14) as compared to a typical write pole tip 30b. Of course, it is preferred to alternate such read poles 15a and write poles 15b around the periphery of carrier 14.

In operation, rotation of shaft 11 causes main pole tips 30a and 30b to move in the direction indicated by arrow 52 relative to the medium. Pole tip 30b thus sweeps across the medium during the write function. Write current signals in the winding on the auxiliary pole (not shown) must be synchronized with the times that each write pole 15b sweeps across the tape medium. The reading function too must be synchronized with the times that a read pole 15a is sweeping across the medium.

To accomplish the results discussed above, it is preferred that the read pole tip 30a width be approximately 80–90 percent of the width of write pole tip 30b. Preferred dimensions at the present time for write pole tip 30b are approximately 25 microns wide and 1–2 microns long. Read pole tip 30a will thus be around 20–22 microns wide and 0.1–0.5 microns long. The height (dimension perpendicular to both width and length) of each pole should be at least 10 times the pole width. Cross sectional area of each pole away from its tip should be at least twice that of the corresponding pole tip area, as shown by the dotted line outlines in FIG. 7.

It is possible that this invention can be adapted to permit high speed data transcription on mediums other than magnetic tape. It is known that data transcription can occur on any medium which is physically positioned directly between an auxiliary pole and the moving main pole and in substantially contacting relationship with the main pole tip. So, for example, it is possible using the apparatus of FIG. 1 to substitute a revolving disk recording medium for tape medium 22 and construct "tracks" formed of concentric circles on the disc, each track comprising a large number of short side-by-side tracks, each approximately radial to the disc itself, and each storing information in serial fashion. By shifting the disc radially relative to the carrier and the auxilliary pole, main tracks of varying radii can be written and then accessed for reading at a later time. The edges of each main track are defined by the width of the auxiliary pole. Other embodiments and variations on the embodiments disclosed above are also possible.

The preceding describes subject matter for which is claimed:

1. In a recording system for use with a vertical format single layer flexible magnetic tape recording medium having first and second sides, an improved data transcription head assembly of the rotating type, including:
    (a) an auxiliary pole having its tip adjacent the first side of the medium;
    (b) a winding around the auxiliary pole;
    (c) a pole carrier having an end face and a periphery whose intersection with the end face is a circle, said pole carrier mounted for rotation about an axis centered on and perpendicular to the circle of intersection, and positioned to place at least an arc of the circle of intersection in substantially contacting relationship along its length across the second side of the medium;
    (d) at least one main pole at least partially carried on the periphery of the pole carrier, each main pole having its transcribing tip coincident with the circle of intersection such that for each revolution of the pole carrier, each transcribing tip is directed toward and sweeps across the medium along the arc of the circle of intersection in substantially contacting relationship with the medium and adjacent to the auxiliary pole tip, thereby allowing data transcription; and
    (e) means resiliently biasing said pole carrier or said auxiliary pole for compressing the tape between the auxiliary pole and the edge of the pole carrier defined by the circle of intersection.

2. The head assembly of claim 1, wherein the compressing means comprises a spring urging one of the pole carrier and the auxiliary pole against the other.

3. The head assembly of claim 2, wherein the pole carrier includes a shaft mounted for rotation and on which the pole carrier is slidably mounted, and a spring encircling the shaft and providing constant pressure on the pole carrier to urge it into substantially contacting relationship with the tape.

* * * * *